United States Patent [19]

Wicks et al.

[11] 4,308,188

[45] Dec. 29, 1981

[54] ZWITTERION POLYMER FOR WATER BORNE COATINGS

[75] Inventors: Zeno W. Wicks, Fargo, N. Dak.; Milton E. Woods, Terre Haute, Ind.; Chiew-Wah Koay, St. Paul, Minn.

[73] Assignee: International Minerals & Chemical Corp., Terre Haute, Ind.

[21] Appl. No.: 155,907

[22] Filed: Jun. 2, 1980

[51] Int. Cl.³ .................................................. C08F 8/32
[52] U.S. Cl. ............................ 260/29.6 HN; 525/328; 525/380; 526/312; 528/113; 528/341; 260/29.6 HN
[58] Field of Search ................ 526/312; 525/328, 380; 528/113, 341

[56] References Cited

U.S. PATENT DOCUMENTS 3,203,935  8/1965  Miranda ................................. 525/380
3,497,550  2/1970  Samour ................................. 526/312
3,585,172  6/1971  Nishiyama ........................... 525/380

Primary Examiner—Paul R. Michl
Attorney, Agent, or Firm—Robert H. Dewey

[57] ABSTRACT

A water-dilutable polymer for use in water-borne coatings comprising the half ester zwitterion reaction product of a polymer containing cyclic acid anhydride groups with an alkanolamine of the formula

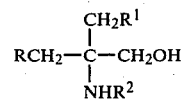

where R is hydrogen or hydroxy, $R^1$ is hydrogen, hydroxy or methyl and can be the same or different, and $R^2$ is hydrogen or an aliphatic hydrocarbon group of from 1 to 3 carbon atoms.

15 Claims, No Drawings

ZWITTERION POLYMER FOR WATER BORNE COATINGS

BACKGROUND OF THE INVENTION

This invention relates to a zwitterion polymer for water borne coatings. In a particular aspect it relates to a thermosetting zwitterion polymer derived from a cyclic acid anhydride.

Increasingly stringent limitations on the emission of volatile organic compounds into the atmosphere have led to the development of "water soluble" industrial baking enamels. Typically the vehicle in such a system is an acrylic or polyester resin with pendant hydroxyl and carboxylic acid groups. The resins are generally prepared as high solids solutions in a cosolvent (in ether-alcohol or alcohol) and partially neutralized with an amine such as 2-N,N-dimethylaminoethanol or 2-amino-2-methyl-1-propanol (AMP). Usually a melamine-formaldehyde resin such as hexamethyoxymethylmelamine (HMMM) is used as a cross-linking agent. The system is diluted to application viscosity with water. During cure at least part of the amine is volatilized and crosslinking between HMMM and the resin occurs. Under emission control regulations, the volatilized amine must be included as a volatile organic compound and hence is objectionable. Also, it has been reported that some secondary and tertiary amines undergo photochemical reactions under atmospheric conditions to yield nitrosamines and nitramines. It would, therefore, be desirable to have a similar system in which amine would not be volatilized during cure.

SUMMARY OF THE INVENTION

It is an object of this invention to provide a zwitterion polymer for water borne coatings.

It is another object of this invention to provide a thermosetting zwitterion polymer derived from a cyclic acid anhydride polymer.

It is still another object of this invention to provide water borne coatings which do not emit amines.

Other objects will be apparent to those skilled in the art from the disclosure herein.

It is the discovery of this invention to provide a zwitterion copolymer for water borne coatings. The zwitterion ion copolymer comprises the reaction product of a polymer containing cyclic acid anhydride groups with an alkanolamine of the formula

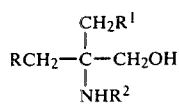

where R can be hydrogen or hydroxy, $R^1$ can be hydrogen, hydroxy, or methyl and $R^2$ is hydrogen or an aliphatic hydrocarbon group of from 1 to 3 carbon atoms. R and $R^1$ can be the same or different.

DETAILED DISCUSSION

When a polymeric acid anhydride, i.e., a polymer containing the group

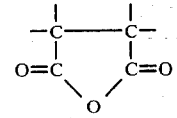

is gently heated, e.g. at about 70°–90° C., with an alkanolamine of the above formula, there is obtained, not primarily the amide as would be expected, but rather the half-ester zwitterion represented by the formula

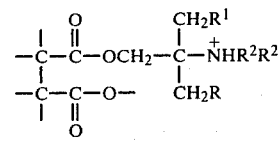

where R, $R^1$ and $R^2$ have the same meanings as defined above. This product is soluble in oxygenated solvents such as aliphatic alcohols, especially those of 3–5 carbon atoms, and alkoxy alkanols. Such solutions are dilutable with water and when applied to a substrate, dry to a clear, transparent film. When the film is baked at 120° C. or above, crosslinking occurs by reaction of the amine group with carboxylic ester groups or carboxylic acid groups within the polymer or copolymer to form ester-amide cross links. No amine or ammonia is emitted to the atmosphere as is the case with conventional water-based films.

Although the zwitterion half ester polymer forms a durable film on baking, it is preferable to use an acid catalyst, many of which are known, such as p-toluene sulfonic acid, butyl phosphoric acid, dinonyl napthalene disulfonic acid and the like, or a crosslinking agent, such as, preferably, hexamethoxymethylmelamine (HMMM) or partially methylolated-partially methylated melamine resins; methylated urea-formaldehyde resins and glycolurilformaldehyde resins. Such cross-linking agents provide even better durability. Acid catalysts, if used, are present in an amount of about 0.1 to 0.5%, preferably about 0.2 to 0.3%, and HMMM or other cross-linking agent is used in an amount of about one mole per 2.5 to 3.5 equivalents of carboxylic acid groups in the polymer. It is also contemplated that a mixture of acid catalyst and cross-linking agent is used in an amount of about one mole per 2.5 to 3.5 equivalents of carboxylic acid groups in the polymer. It is also contemplated that a mixture of acid catalyst and cross-linking agent will be used in which case the catalyst is used in an amount of about 1.0% based on the weight of the cross-linking agent.

As is the case generally with water-based coatings, the aqueous dispersions of the present invention can be formulated with the usual pigments, preservatives, thickeners, etc., which form no part of this invention.

It is an embodiment of the present invention to provide copolymers of the vinyl ester of trimellitic anhydride with acrylics and methacrylics which are believed to be novel. These copolymers are suitable for use as the polymeric anhydride in the practice of this invention. They can be prepared by reacting vinyl trimellitic anhydride (VTMA), which is known, e.g. from J. R. Stevens and R. E. Van Strien, U.S. Pat. No. 3,063,969, with an alkyl ester of acrylic or methacrylic acid. Generally a lower alkyl ester of from 1 to 4 carbon atoms is preferred. Typically the copolymer is prepared by reacting an excess of acrylic ester in a suitable solvent, e.g., acetonitrile, with the VTMA in the presence of an initiator such as bis azoisobutyronitrile at reflux temperature, e.g. about 85° C., until the reaction is complete. The excess monomer is then separated from the copolymer by any suitable means. A typical copolymer with butyl acrylate (BA) so prepared had an acid number of 125 (equivalent weight 898 as acid anhydride). It was determined that the ratio of VTMA to BA in the copolymer was 1:5.3.

To prepare the half ester zwitterion of this invention, the polymeric acid anhydride, e.g. the copolymer prepared above, and the alkanolamine, e.g. 2-amino-2-methyl-1-propanol, are mixed in equal equivalents preferably in a suitable, i.e. non-reactive, solvent such as acetonitrile and refluxed at about 80° C. until the reaction is determined to be complete, e.g. about 2 hours.

The product precipitates and is recovered by filtration, washed and dried. Usually some 2-hydroxyalkyl half amide is also obtained as a by-product but it is not objectionable because it can react by transesterification when the coating is baked.

The recovered zwitterion half-ester polymer is dissolved in a suitable solvent, such as a lower aliphatic alcohol of 3–5 carbon atoms, or a lower alkoxyethanol. A preferred solvent is butoxyethanol. The solvent selected should be soluble in water to the extent that dilution with water does not result in two liquid phases.

The polymeric zwitterion is now suitable for use in the preparation of a water-based coating by dispersing in it the necessary pigments, viscosity improvers, etc. and diluting to the desired solids content with water as is well known. When the coating has been applied to a substrate, it is cured by heating to 120° C. or higher either alone or in the presence of a catalyst such as p-toluene sulfonic acid or in the presence of a cross-linking agent such as hexamethoxymethylmelamine.

Other polymers containing acid anhydride groups are known in the art and include the reaction products of maleic anhydride with drying oils and epoxy esters (i.e. maleated oils and maleated epoxy esters). Other suitable anhydrides include styrene-maleic anhydride, polymeric 4-palmityl-1,2-butyric anhydride (commercially available as PA-18 from Gulf Chemicals Company), and polymeric 3-methoxy-1,2-butyric anhydride (commercially available as Gantrez from GAF Corporation). When these latter anhydrides as well as the maleated oils and expoxies are used as the acid anhydrides, a cross-linking agent such as hexamethoxymethylmelamine (Cymel 303, for example) should be included in the formulation in an amount of about 5–25%, preferably 10–15%. However, it is not intended that the invention be limited to these polymers. Rather it is intended that the invention include all polymers having cyclic acid anhydride groups. The maleated drying oils are well known in the art and include but are not limited to the reaction product of maleic anhydride with drying oils such as linseed oil, fish oils, tung oil, and the like. Any of the known maleated drying oils can be used in the practice of this invention. Maleated epoxy ester resins are also known in the art and any of those known can be used in the practice of this invention.

The alkanolamines suitable for the practice of this invention are primary or secondary amines represented by the formula hereinbefore set forth. The preferred amines are primary amines and particularly preferred alkanolamines include but are not limited to 2-amino-2-methyl-1-propanol; 2-amino-2-methyl-1,3-propanediol; 2-amino-2-ethyl-1,3-propanediol and 2-amino-2-hydroxymethyl-1,3-propanediol. The particularly preferred amine is 2-amino-2-methyl-1-propanol. Of the secondary alkanolamines those wherein $R^2$ is methyl are particularly preferred.

The invention will be better understood by reference to the following examples. It is understood, however, that the examples are intended only for illustration and it is not intended that the invention be limited thereby.

EXAMPLE 1

Monovinyl Ester of trimellitic Anhydride (VTMA)

A mixture of 249.5 g (1.8 mole) of trimellitic anhydride (TMA) and 990 g (11.5 mole) of freshly distilled vinyl acetate was stirred and heated at reflux for 3 hours. After cooling to 55° C., 7.62 g of mercuric acetate was added and 20 minutes later 0.72 mL of conc. $H_2SO_4$ was added dropwise. The reaction mixture was then heated for 30 hours at 55° C. with a slow sweep of $N_2$. Then 4.2 g of sodium acetate trihydrate was added and the solution was filtered. After standing at room temperature overnight, 20 g of unreacted TMA crystallized out and was removed by filtration. When the filtrate was cooled in a dry ice-acetone bath, the monovinyl ester of TMA (VTMA) crystallized out and was recovered by filtration. The yield of crude VTMA was 314 g (80% of theory) and it had a melting point of 118°–123° C. The crude VTMA was recrystallized three times from a mixture of chloroform and benzene. The yield was 239 g (61%) of product with mp 127°–129.5° C. (lit 129.5° C.). The anhydride equivalent weight as determined by reacting with excess morpholine at 25° C. for 0.5 hour in methanol, was 221 (calcd. 219).

Copolymerization of VTMA and Butyl Acrylate (BA)

Solutions were prepared of 799 g (6.2 moles) of freshly vacuum distilled BA in 230 mL of acetonitrile and 340 g (1.56 mole) of VTMA and 51.2 g (4.5% of total monomers) of bis azoisobutyronitrile in 850 mL of acetonitrile. About 5% of each solution was charged into a flask and while stirring was heated to reflux (85° C.). After refluxing for 30 minutes, addition of the BA and VTMA-initiator solutions from separate dropping funnels was started. The two solutions were added in proportion to their volumes over a period of 6 hours while maintaining the reaction at reflux temperature (approximately 85° C.). Heating was continued for an additional 16 hours. In order to separate the polymer from unreacted monomers, 500 mL of n-heptane was added. A viscous yellowish layer separated. After decanting the supernatant layer, the polymer phase was washed with three 500 mL portions of hot n-heptane. After removing solvent under vacuum, the yield of polymer was 950 g (80%). The presence of anhydride groups was confirmed by IR absorption at 1850 and 1775 cm$^{-1}$. The acid number was 125 (expressed as acid equivalent weight, 446) and the anhydride equivalent weight was 898. Thus, within experimental error, all of the acid was present as anhydride. Based on the equivalent weight, the mole ratio of VTMA/BA in the copolymer was 1/5.3 whereas the starting monomer ratio was 1/4. Gel Permeation Chromatography showed a single fairly broad peak, $\overline{M}w$, 24,200; $\overline{M}n$, 7,700; $\overline{M}w/\overline{M}n$, 3.1 (based on polystyrene standards).

Reaction of VTMA/BA Copolymer with AMP

A solution of equal equivalent amounts of VTMA/BA copolymer (113 g, 0.126 equiv) and AMP 11.2 g, 0.126 equiv) in 120 mL freshly dried and distilled acetonitrile was refluxed at 80° C. for 2 hours. The product precipitated as a yellowish solid and was recovered by filtering the hot reaction mixture. After washing with ether, the polymer was dried, yield 106 g (85%). It was then dissolved in 2-butoxyethanol with gentle warming to give a 61% solids solution. The acid number was 63.5 (equivalent weight 884) as determined by titration with aqueous NaOH. The amine equivalent weight was 1081 as determined by non-aqueous titration. Based on these titrations 83% of the anhydride had been converted to the ester zwitterion and 17% had been converted to the amide. The ratio of $NH_2/COOH$ was 81.8%. For convenience hereafter this zwitterion polymer is referred to simply as the polymer.

A sample of the polymer was diluted with sufficient water to produce viscosity of 3 poise (21.5% solids) and drawn down with a wirebound bar on unprimed steel panels. After flashing off for about 10 minutes, they were baked for 30 minutes at 175°, 150° and 125° C. Methyl ethyl ketone rub tests were performed on all coated panels and the results are given in the table. On panels baked at 175° C. well-known tests such as Tukon hardness, conical mandrel flexibility (no failures), reverse impact resistance (no failure to 80 in.-lb) and cross hatch adhesion (no failure) tests were also run. Some panels were also exposed to a Cleveland Condensing Humidity test. No blistering was observed after 1500 hours exposure of coatings cured at 150° or 175° C. Tests were also made on the effect of adding 0.21% p-toluene sulfonic acid (pTSA) (based on polymer solids) and on the addition of 17.7% hexamethoxymethylmelamine (HMMM) (based on polymer solids; approximately 3 equivalents of COOH per mole of HMMM), plus 1.0% pTSA (based on HMMM).

The polymer film alone baked at 150°–175° C. had hardness of 8.7 and survived 150 MEK double rubs before it failed.

|  |  | MEK Rubs | Tukon Hardness |
|---|---|---|---|
| Polymer alone cured at | 125° C. | 18 | — |
|  | 150° C. | 150 | — |
|  | 175° C. | 150 | 8.7 |
| Polymer with pTSA | 125° C. | 60 | — |
|  | 150° C. | 290 | — |
|  | 175° C. | 290 | 18 |
| Polymer + pTSA + HMMM | 125° C. | — | — |
|  | 150° C. | — | — |
|  | 175° C. | >600 | 51 |

A white enamel is made by dispersing titanium dioxide in the polymer solution then diluting with water to spraying viscosity. The coating after curing at 150°–175° C. is satisfactory.

EXAMPLE 2

The experiment of Example 1 is repeated in all essential details except that a polymer of a maleated epoxy ester is substituted for the VTMA/BA copolymer on an equivalent anhydride basis. The maleated epoxy ester is the reaction product obtained by reacting bisphenol A epoxy resin (Epon 1004 marketed by Shell Chemical Company) with 80% of the theoretical amount of dehydrated castor oil acids which is then reacted with 5% by weight of maleic anhydride at 100° C. The polymeric product thereby obtained can be diluted with water and is used to prepare a satisfactory coating. HMMM is included as a cross-linking agent.

EXAMPLE 3

The experiment of Example 1 is repeated in all essential details except that a maleated linseed oil is substituted for the VTMA/BA copolymer on an equivalent anhydride basis. The polymeric product thereby obtained is dilutable with water and is used to prepare a satisfactory baking enamel. HMMM is included as a cross-linking agent.

EXAMPLES 4–6

The experiment of Example 1 is repeated in all details except that the following alkanolamines are substituted for AMP on an equimolar basis:

| Example No. | Alkanolamine |
|---|---|
| 4 | 2-Amino-2-methyl-1,3-propanediol |
| 5 | 2-Amino-2-ethyl-1,3-propanediol |
| 6 | Tris(hydroxymethyl)aminomethane |

The polymers thereby obtained are dilutable with water and are formulated into coatings having satisfactory characteristics. The baked films obtained from the coatings have good durability.

EXAMPLES 7–9

The experiment of Example 1 is repeated in all essential details except that the following esters are substituted for butyl acrylate on an equimolar basis:

| Example No. | Acrylate Ester |
|---|---|
| 7 | Methyl methacrylate + butylacrylate, 1:1 |
| 8 | Ethyl acrylate |
| 9 | Butyl methacrylate |

The polymers thereby obtained are dilutable with water and are formulated into coatings having satisfactory characteristics. The baked films obtained from the coatings have good durability.

EXAMPLE 10

The experiment of Example 1 is repeated in all essential details except that a polymer of styrene-maleic anhydride is substituted for the VTMA/BA copolymer on an equivalent anhydride basis. The polymeric product thereby obtained is dilutable with water and is used to prepare a satisfactory coating. HMMM is included as a cross-linking agent.

EXAMPLE 11

The experiment of Example 1 is repeated in all essential details except that poly-4-palmityl-1,2-butyric anhydride (PA-18 marketed by Gulf Chemicals Company) is substituted for the VTMA/BA copolymer on an equivalent anhydride basis. The polymeric product thereby obtained is dilutable with water and is used to prepare a satisfactory white baking enamel. HMMM is included as a cross-linking agent.

EXAMPLE 12

The experiment of Example 1 is repeated in all essential details except that maleinized rosin (anhydride) is substituted for the VTMA/BA copolymer on an equivalent anhydride basis. The polymeric product thereby obtained is dilutable with water and is used to prepare a water-based flexographic ink.

EXAMPLE 13

The experiment of Example 1 is repeated in all essential details except that poly-3-methoxy-1,2-butyric anhydride (Gantrez, marketed by GAF Corporation) is substituted for the VTMA/BA copolymer. The polymeric product thereby obtained is dilutable with water and is used to prepare a satisfactory coating. HMMM is included as a cross-linking agent.

We claim:

1. A polymer useful in water-borne coatings comprising the half ester zwitterion reaction product of a polymer containing acid anhydride groups with an alkanolamine of the formula

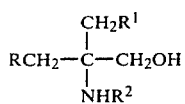

where R is hydrogen or hydroxy and $R^1$ is hydrogen, hydroxy or methyl and can be the same or different, and $R^2$ is hydrogen.

2. The polymer of claim 1 wherein R and $R^1$ are each hydrogen.

3. The polymer of claim 1 wherein R and $R^1$ are each hydroxyl.

4. The polymer of claim 1 wherein R is hydroxyl and $R^1$ is hydrogen.

5. The polymer of claim 1 wherein R is hydroxyl and $R^1$ is methyl.

6. The water borne coating consisting essentially of the polymer of claim 1 dispersed in water.

7. A polymer obtained by reacting (a) a copolymer by reacting the vinyl ester of trimellitic anhydride with an alkyl acrylate or alkyl methacrylate, or mixture thereof, the alkyl group having from 1-4 carbon atoms, and (b) an alkanolamine of the formula

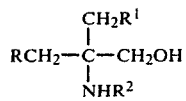

where R is hydrogen or hydroxy and $R^1$ is hydrogen, hydroxy or methyl and can be the same or different, and $R^2$ is hydrogen, an aliphatic hydrocarbon group or aryl.

8. A polymer of claim 7 wherein the alkanolamine is 2-amino-2-methyl-1-propanol.

9. A polymer useful in water-borne coatings comprising the half ester zwitterion reaction product of (a) a polymer prepared from a maleated epoxy ester, a maleated drying oil, styrenemaleic anhydride, maleinized rosin, 4-palmityl-1,2-butyric anhydride and 3-methoxy-1,2-butyric anhydride with (b) an alkanolamine of the formula

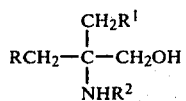

where R is hydrogen or hydroxy, $R^1$ is hydrogen, hydroxy or methyl and can be the same or different, and $R^2$ is hydrogen, an aliphatic hydrocarbon group or aryl.

10. A polymer of claim 9 prepared from maleated epoxy ester.

11. A polymer of claim 9 prepared from a maleated drying oil.

12. A polymer of claim 9 prepared from styrene-maleic anhydride.

13. A polymer of claim 9 prepared from maleinized rosin.

14. A polymer of claim 9 prepared from polymeric 4-palmityl-1,2-butyric anhydride.

15. A polymer of claim 9 prepared from polymeric 3-methoxy-1,2-butyric anhydride.

* * * * *

UNITED STATES PATENT AND TRADEMARK OFFICE
CERTIFICATE OF CORRECTION

PATENT NO. : 4,308,188
DATED : December 29, 1981
INVENTOR(S) : Zeno W. Wicks et al It is certified that error appears in the above-identified patent and that said Letters Patent are hereby corrected as shown below:

Column 2, line 16, that portion of the formula which reads "$-\overset{+}{N}HR^2R^2$" should read -- $-\overset{+}{N}H_2R^2$ --

Signed and Sealed this

Eighteenth Day of May 1982

[SEAL]

Attest:

GERALD J. MOSSINGHOFF

Attesting Officer — Commissioner of Patents and Trademarks